US006200198B1

(12) United States Patent
Ukai et al.

(10) Patent No.: US 6,200,198 B1
(45) Date of Patent: Mar. 13, 2001

(54) METHOD OF CUTTING OF METAL MATERIALS AND NON-METAL MATERIALS IN A NON-COMBUSTIBLE GAS ATMOSPHERE

(75) Inventors: Hisashi Ukai; Takayuki Suzuki; Toshiyuki Suzuki, all of Hamamatsu (JP)

(73) Assignee: Enshu Limited, Shizuoka (JP)

( * ) Notice: Subject to any disclaimer, the term of this patent is extended or adjusted under 35 U.S.C. 154(b) by 0 days.

(21) Appl. No.: 09/172,658

(22) Filed: Oct. 15, 1998

(30) Foreign Application Priority Data

| Oct. 20, 1997 | (JP) | 9-304841 |
| Oct. 29, 1997 | (JP) | 9-312640 |
| Nov. 6, 1997 | (JP) | 9-320345 |
| May 13, 1998 | (JP) | 10-148454 |
| Jul. 28, 1998 | (JP) | 10-227670 |

(51) Int. Cl.$^7$ ................................................. B24B 1/00
(52) U.S. Cl. ............................ 451/53; 451/449; 451/488
(58) Field of Search ............................. 83/169; 407/11; 408/56, 61; 409/135, 136; 451/53, 449, 448

(56) References Cited

U.S. PATENT DOCUMENTS

| 2,635,399 | * | 4/1953 | West, Jr. ........................... 451/53 |
| 4,563,924 | | 1/1986 | Runkle et al. . |
| 5,006,021 | | 4/1991 | Wheetley . |
| 5,214,991 | * | 6/1993 | Shimizu et al. ................... 83/168 |
| 5,228,369 | * | 7/1993 | Itoh et al. ...................... 451/53 X |
| 5,291,693 | * | 3/1994 | Nguyen . |
| 5,419,732 | * | 5/1995 | Kaneko et al. ................. 451/53 X |
| 5,615,981 | * | 4/1997 | Wheatley .......................... 408/1 R |
| 5,645,382 | * | 7/1997 | Homanick et al. ................ 409/131 |
| 5,931,721 | * | 8/1999 | Rose et al. ......................... 451/89 |

FOREIGN PATENT DOCUMENTS

| 48-44579 | 9/1971 | (JP) . |
| 55-96249 | 7/1980 | (JP) . |
| 57-211460 | 12/1982 | (JP) . |
| 58-022609 | 10/1983 | (JP) . |
| 63-62339 | 12/1988 | (JP) . |
| 5-169345 | 7/1993 | (JP) . |
| 5-220665 | 8/1993 | (JP) . |
| 7-501989 | 3/1995 | (JP) . |
| 2568975 | 10/1996 | (JP) . |
| WO 84/04714 | 12/1984 | (WO) . |

OTHER PUBLICATIONS

European Search Report dated Apr. 12, 2000.
Degarmo Black and Kohser: "Materials & Processes in Manufacturing" 1984, MacMillan, New York, pp. 151–516.
Sandvik Coromant, "Turning Guide", 1985, pp. 22–26.

* cited by examiner

Primary Examiner—Timothy V. Eley
(74) Attorney, Agent, or Firm—McGinn & Gibb, PLLC

(57) ABSTRACT

A method of cutting metal materials and non-metal materials in a non-combustible gas atmosphere, the method including forming a non-combustible gas atmosphere, providing the non-combustible gas atmosphere to at least one of a cutting part of a machine tool and an area adjacent to the cutting part, and machining the metal materials and the non-metal materials using the cutting part, and where the non-combustible gas includes one of nitrogen gas and carbon dioxide gas, and where the non-combustible gas occupies a proportion of at least 90% of the non-combustible gas atmosphere.

29 Claims, 19 Drawing Sheets

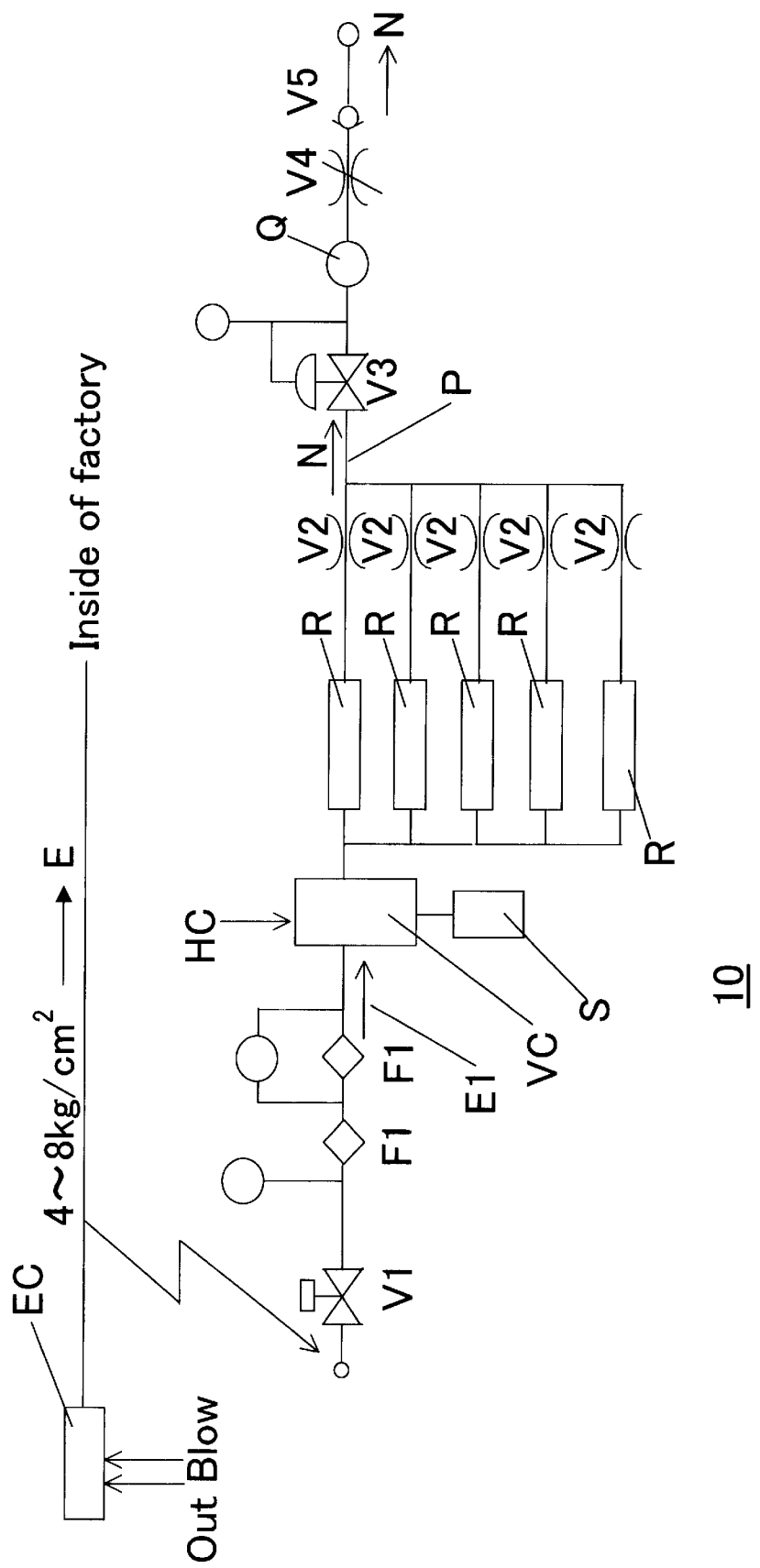

FIG.6

| | Air blow | Nitrogen gas blow |
|---|---|---|
| Tool Life | 10 hours | 50~100 hours |
| Machined Surface | Rz2 $\mu$m | Rz1.2~1.5 $\mu$m |
| Cut chips temperature | 1000 °C | 800°C under |

NitrogenDensity And Flank Wear

Coating Peel-Off Test

Cutting Speed And Flank Wear
(Cutting Length:18m Material:S55C Steel)

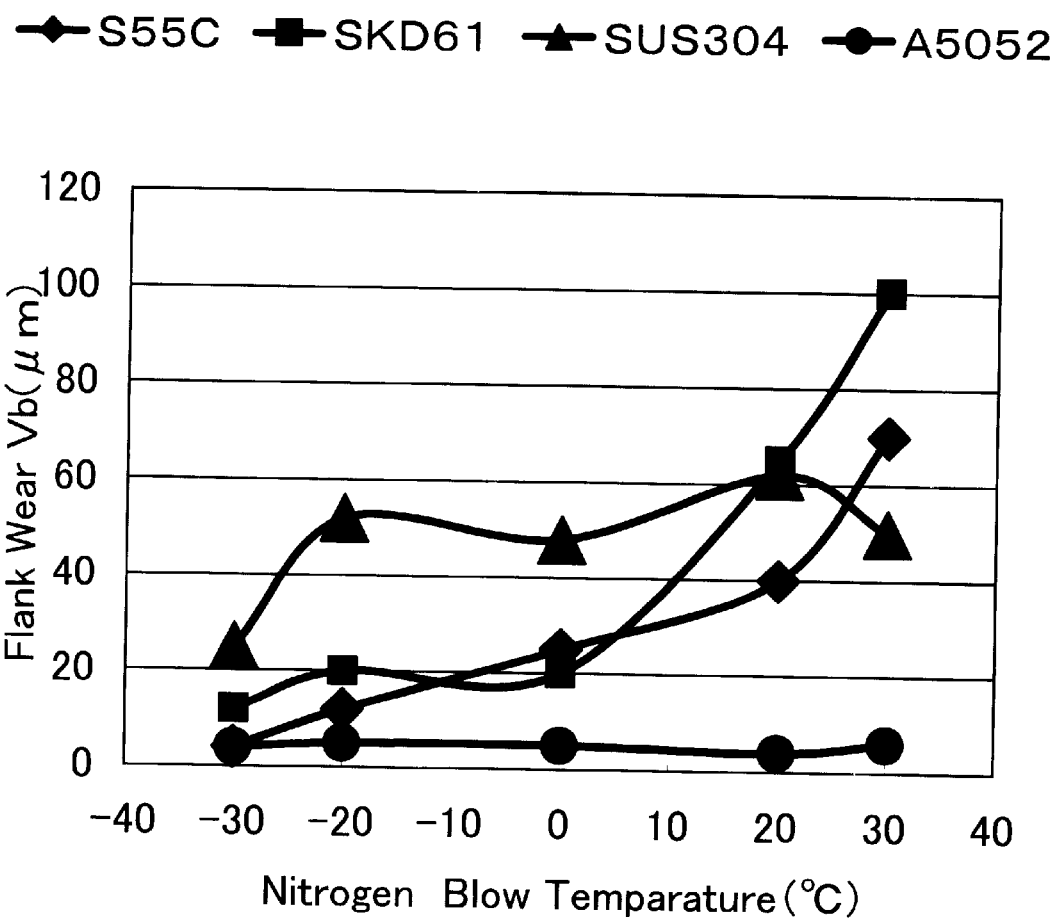

NITROGEN BLOW

AIR BLOW

METHOD OF CUTTING OF METAL MATERIALS AND NON-METAL MATERIALS IN A NON-COMBUSTIBLE GAS ATMOSPHERE

BACKGROUND OF THE INVENTION

1. Field of the Invention

The present invention relates to a method of cutting metal and non-metal materials with a tool attached to a working machine (e.g., a milling machine, lathe, grinding machine, gear cutting machine, etc.) that generates a non-combustible gas atmosphere at and around the tip of a cutting tool.

2. Description of the Related Art

Conventional cutting tools are usually attached to the spindle of a working machine and are cooled by injection of cutting liquid (e.g., liquid coolant) from the nozzle of a working machine to the top of the tool. This reduces friction and lowers the temperature of the tool, thereby ensuring more effective cutting and longer tool life. In addition, the injection pressure of the liquid coolant also works to wash away cut chips from the cutting area.

However, this conventional cutting and cooling method also necessitates the disposal of the sludge produced as a by-product of the liquid coolant. Since the used liquid coolant is mixed in with the sludge, it is difficult to dispose of the waste liquid without polluting the environment.

Environmental concerns in the workplace and in the local and global community lend impetus to the drive for better, safer preservation efforts. Thus, waste disposal of the spent cutting liquid (e.g., liquid coolant) becomes complicated and almost impossible. Under these circumstances, devising a cutting method that does not use a liquid coolant with its resulting waste is greatly needed.

Another problem exists in conventional methods because the cutting liquid is customarily recycled and reused. As a result, the liquid may experience a rise in temperature over time, possibly causing thermal expansion in machine parts. Thermal expansion is a major cause of inaccurate machining.

To overcome the above problems, there is a "dry cut" method which blows low-temperature air on the cutting part without using liquid coolant. Although sludge disposal is no longer required with the "dry-cut" or air-blow method, oxidization is accelerated at the cutting point, which results in a poor quality of the machined surface. In addition, this air-blow method provides inferior cooling efficiency of the cutting part compared to the liquid coolant method, and the cutting part becomes worn more quickly. Consequently, as the cutting part wears, the accuracy of a machined surface becomes increasingly poor.

Furthermore, when cutting is carried out on any high-viscosity material such as aluminum, a built-up edge may form on the cutting part resulting in poor accuracy on the aluminum material along with a deterioration in tool efficiency. In addition, coil-shape aluminum chips are formed making the dry-cut method more difficult.

SUMMARY OF THE INVENTION

In view of the foregoing it is, therefore, an object of the present invention to provide a method of cutting in a non-combustible gas atmosphere in which a flow of gas (e.g., nitrogen or carbon dioxide) is applied to the cutting point of a tool.

Additionally, it is an object of the present invention to provide a method of cutting in which longer tool life is secured, even under the "dry-cut" operation.

It is another object of the present invention to provide a method of cutting in which practical conditions of machining, as well as pressure, density and method of blowing of non-combustible gas, secure longer tool life.

It is a further object of the present invention to provide a method of cutting in which improved machining accuracy using iron, steel, and aluminum materials is obtained along with improved disposal of cut chips.

To achieve the above and other objects, there is provided a method of cutting metal and non-metal materials in a non-combustible gas atmosphere with a tool attached to a working machine. This is accomplished by providing a non-combustible gas atmosphere such as a nitrogen gas or a carbon dioxide gas which occupies a proportion of at least 90% at and around a cutting part which is used for machining metal and non-metal materials.

Further, there is provided a method of cutting metal and non-metal materials in a non-combustible gas atmosphere with a tool attached to a working machine, by making a non-oxide gas atmosphere of a nitrogen gas which occupies a proportion of at least 90% at and around a cutting part and at a machining temperature not less than 500° C.

In a preferred embodiment of the present invention, a coating such as a hard metal coating or multi-ply coating may be formed on the cutting part.

In a further preferred embodiment of the present invention, an ideal blow pressure of the non-combustible gas, between 0.2 Mpa (2 kg/cm$^2$) and 1.0 Mpa (10 kg/cm$^2$), is supplied.

In another preferred embodiment, the non-combustible gas may be supplied to the cutting part via a penetrating supply hole and the metal material may be iron steel (e.g., iron-based material).

In a further preferred embodiment, the metal material may be aluminum.

With this structure it is possible to supply the non-combustible gas, such as nitrogen or carbon dioxide, to the cutting part of the tool attached to the machine's spindle and to the space around the cutting part at a proportion of at least 90%. Since the non-combustible gas is distributed in an atmospheric dispersion to the cutting part and surrounding space, cut chips which may have become heated during cutting are cooled. Further, the oxidation resistance of the cutting part is increased, thereby preserving the life of the tool.

Further, nitrogen gas is supplied to the cutting part of the tool at a proportion of at least 90% and at a machining temperature not less than 500° C. Accordingly, the nitrogen gas forms a nitride on the cutting part surface, improving the tip's wear resistance and providing a longer tool life.

Additionally, the coating to which the nitrogen gas is supplied is further strengthened as the a hard metal or multiply coating forms on the cutting part. As a result, no sparking occurs and no defects such as coating peel-off or adhesion of cut chips are observed at the cutting part, even after expiration of the tool life. Therefore, a longer tool life can be obtained by the method of the present invention.

According to a preferred embodiment, the blow pressure of the non-combustible gas is controlled so that the preferred pressure level is obtained. This level varies, according to the type of metal or non-metal material to be machined, or to the type of tool to be used, within the range of 0.2–1.0 Mpa (2–10 kg/cm$^2$). Accordingly, the non-combustible gas can effectively and economically be blown, thereby the metal or non-metal material can be effectively machined and tool life extended.

According to another aspect of the invention, the blowoff nozzle is used as a supply means for the non-combustible gas at the machining point of the cutting part. The gas supply to the preferred machining position can be carried out regardless of the shape of tool, thereby achieving the most effective application of the non-combustible gas.

Further, as a supplying nozzle (e.g., the center hole) penetrating through the tool is used as a non-combustible gas blow means, a concentrated gas supply at the narrow machining point of the cutting part can be provided. In particular, even in the case of a deep hole drilling machine or the like, it is possible to supply the gas to the workpiece to which an ordinary blowoff nozzle could not. Consequently, the most effective non-combustible gas distribution can be accomplished regardless of machining conditions.

In a further aspect, as the non-combustible gas is blown onto the iron steel material, it cools the machining point of the metal and aids oxidation resistance. An additional advantage is that the life of the cutting part is extended as the tip is nitrided. The longer tool life allows for accuracy in machining to be maintained for a greater period of time.

According to another aspect, as the non-combustible gas is blown onto the aluminum material, it cools the machining point of the metal and aids oxidation resistance. Furthermore, this method ensures that there is no adhesion of aluminum cut chips to the cutting part of the tool regardless of coating. Also, any cut chips formed are maintained in good condition due to the cooling effect. By eliminating the chips from the tip, the method of the present invention allows for a more accurate machining of the aluminum material than the air blow method.

The present invention relates to the disclosures of the Japanese utility model unexamined publication No. Sho 48-44579, the Japanese patent unexamined publications Nos. Sho 55-96249, Sho 57-211460, Sho 63-62339, Hei 5-220665 and Hei 7-501989, the Japanese patent (examined) publication No. 5-169345, and the Japanese (granted) patent No. 2568975.

BRIEF DESCRIPTION OF THE DRAWINGS

The invention will be described below in detail with reference to the accompanying drawings, in which:

FIG. 3 is a block diagram of a nitrogen gas generation device using the invention, according to a first embodiment of the present invention;

FIG. 6 is a table showing comparative characteristics between a nitrogen gas blowing method according to the present invention and an air blowing method according to the conventional art;

FIG. 13 is a graphic chart showing the relationship between nitrogen gas blow temperature and amount of peripheral flank wear of the end mill according to the present invention;

DETAILED DESCRIPTION OF THE INVENTION

Figure 1A:
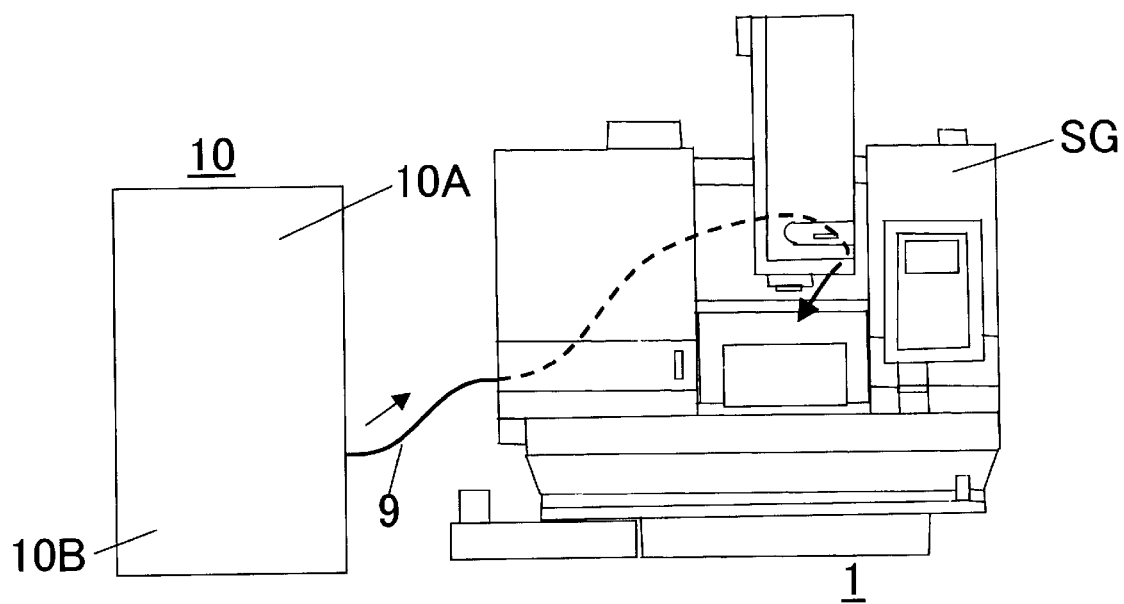
FIG. 1(a) is a view of a working machine using the invention, according to a first embodiment.

Referring now to the drawings, and more particularly to FIGS. 1–18, there are shown preferred embodiments of the method and structures according to the present invention.

Figure 1B:
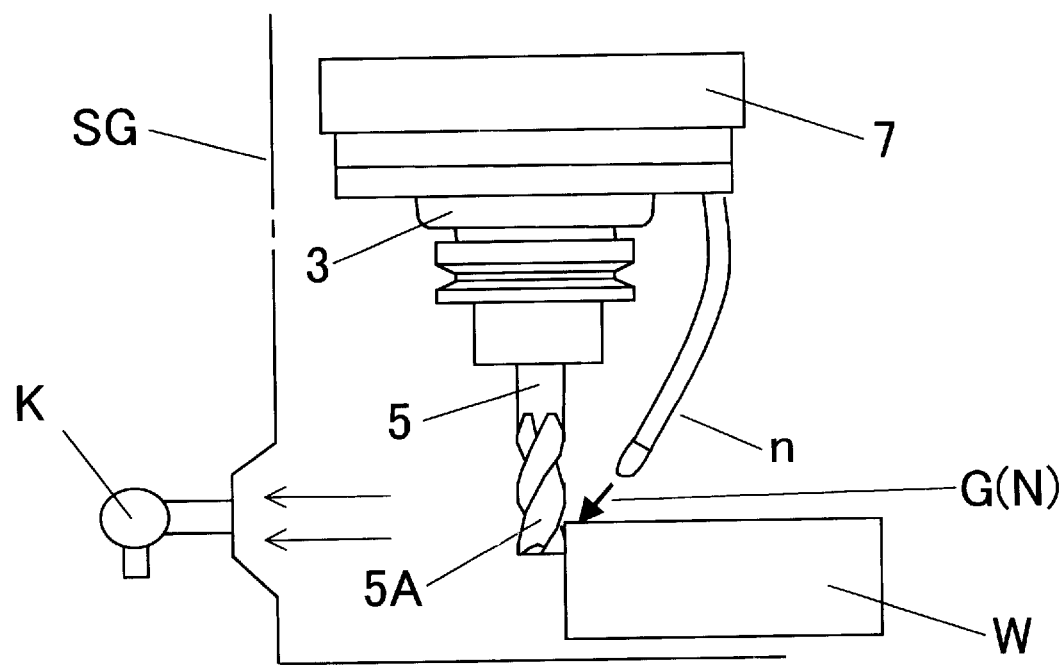
FIG. 1(b) is a view of the working machine of FIG. 1(a) showing a more detailed view of an essential part, including a cutting area.

FIGS. 1(a) and 1(b) are elevational views of a working machine to which a first embodiment of the present invention is applied, in which cutting is carried out by the blowing of non-combustible gas.

Figure 2A:
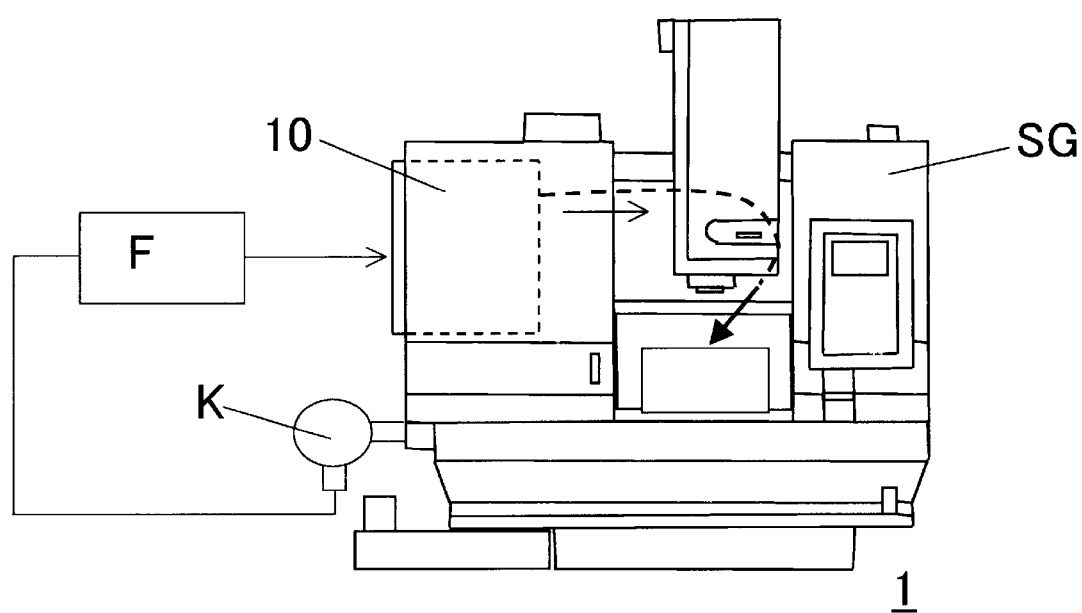
FIG. 2(a) is a view of a working machine using the invention, according to a second embodiment.
Figure 2B:
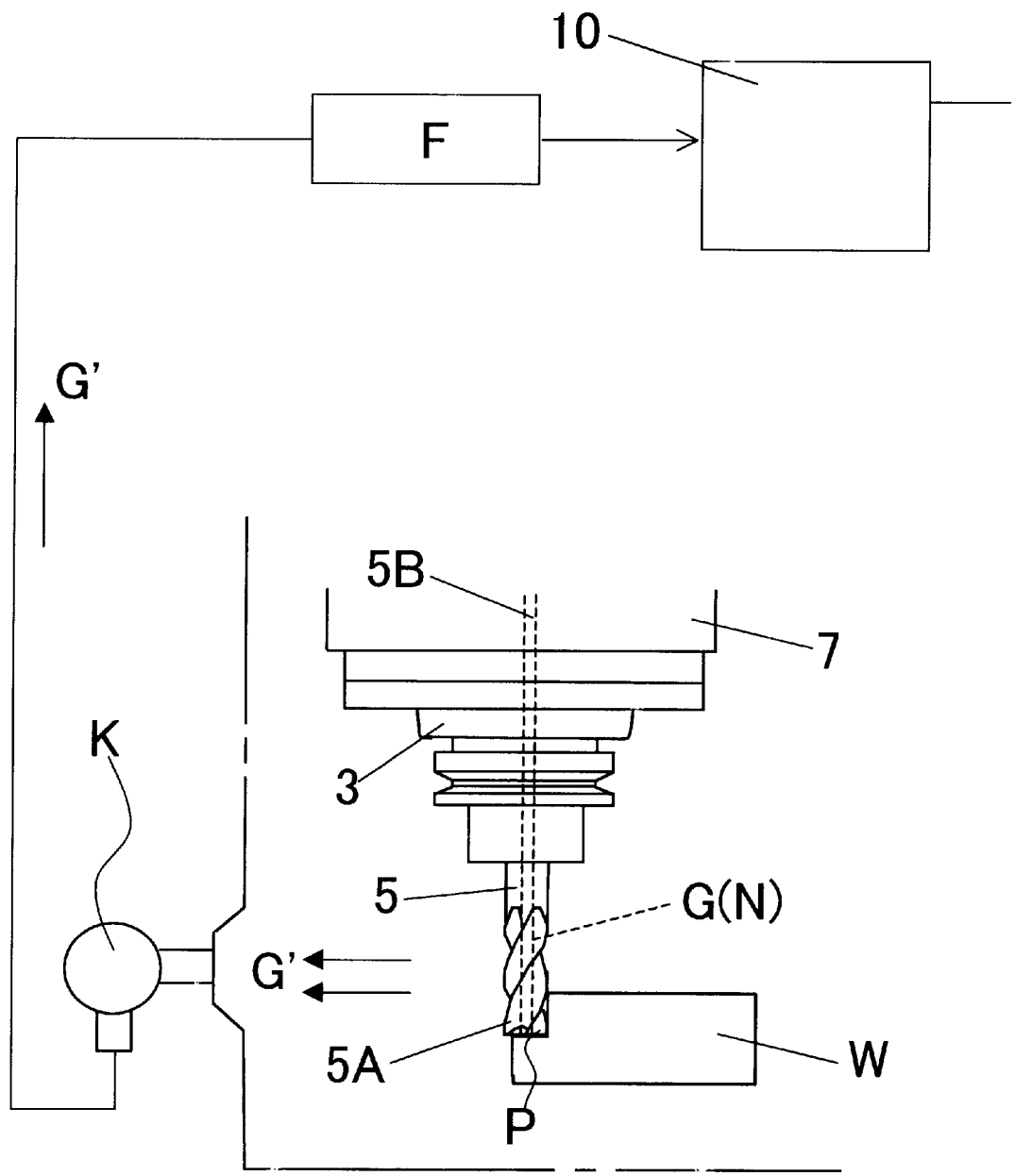
FIG. 2(b) is a view of the working machine of FIG. 2(a) showing a more detailed view of an essential part, including a cutting area.

FIGS. 2(a) and 2(b) are elevational views of a working machine to which a second embodiment of the present invention is applied.

Figure 4:
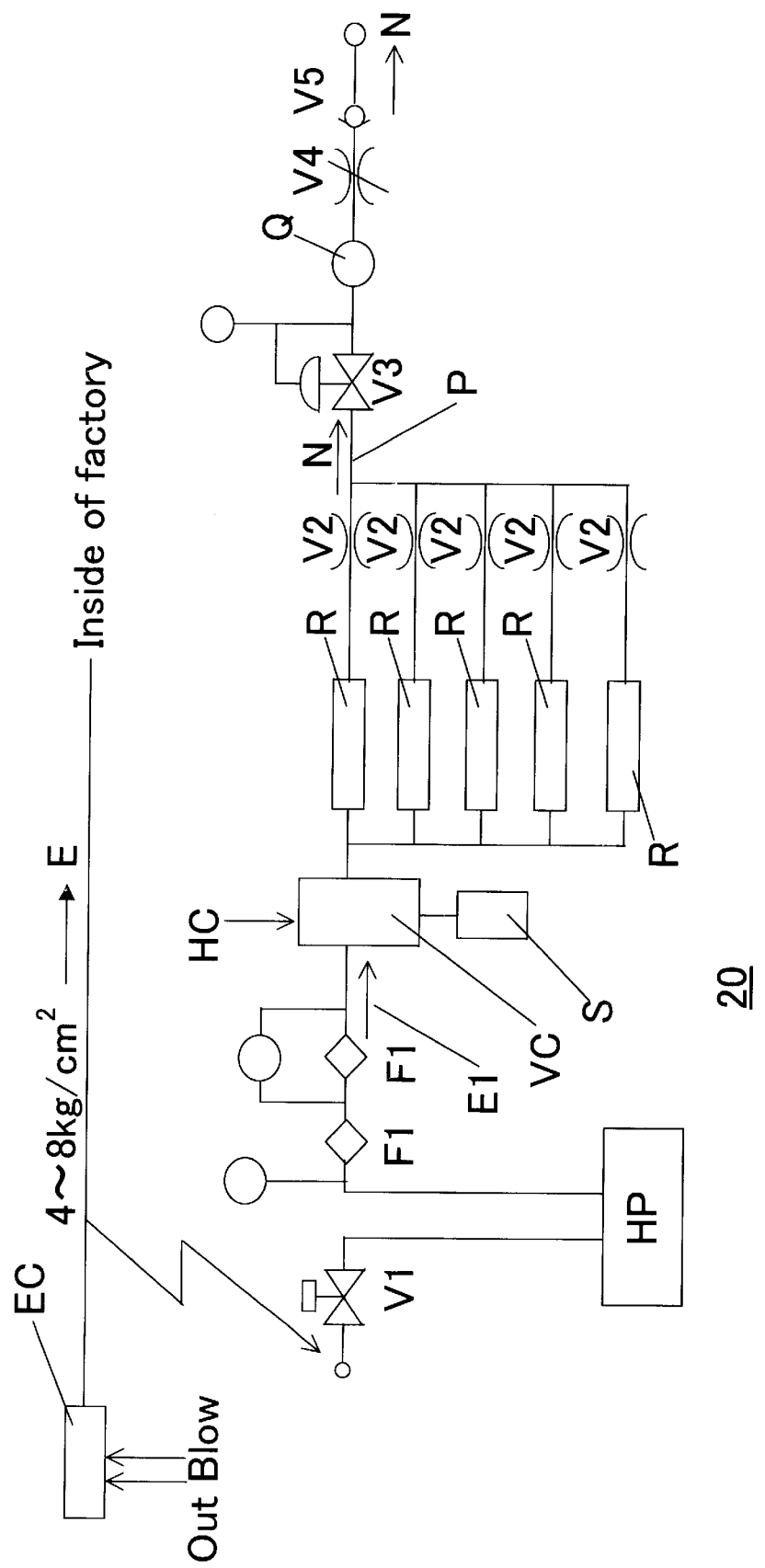
FIG. 4 is a block diagram of a nitrogen gas generation device using the invention, according to a second embodiment of the present invention.

FIGS. 3 and 4 are respectively block diagrams of non-combustible gas generation devices according to the first and second embodiments.

First Embodiment

Firstly, a method of cutting using non-combustible gas blow, according to the first embodiment of the present invention, is described with reference to FIGS. 1(a) and 1(b).

FIGS. 1(a) and 1(b) show a working machine 1 having a high-speed rotation spindle 3, to which a cutting part 5A is attached. Separately provided is a blowoff nozzle n aimed at the cutting part 5A. The blowoff nozzle n may be provided, for example, on a spindle head 7 supporting the spindle 3. The blowoff nozzle n is connected to a gas supply 10 via a pipe 9.

Through this connection a non-combustible gas G, such as a nitrogen gas N or carbon dioxide gas ($CO_2$), is supplied to the blowoff nozzle n. A non-combustible gas generation device 10A which generates the non-combustible gas G, or a non-combustible gas tank 10B, may serve as the gas supply 10. When the nitriding function of the present invention is required the selection of nitrogen gas N provides the optimum results.

The blow temperature of the non-combustible gas G is controlled within a range of room (e.g., normal) temperature and −150° C. so that cutting may be carried out in at an ideal temperature. The temperature control is provided by a cooling device (not shown) serving as a temperature control device. Accordingly, the cooling device supplies the non-combustible gas G, the temperature of which is controlled to be optimal for application to a workpiece W (e.g., made of metal material or of non-metal material such as ceramic or resin) or a tool 5, to the blowoff nozzle n. The supply of the non-combustible gas G to the blowoff nozzle n is also controlled so that an optimal blow pressure for application to the workpiece W or the tool 5 may be obtained, within the range of 0.2–1.0 Mpa 2–10 kg/cm$^2$).

The spindle 3 of the working machine 1 is surrounded by a fully closed splash guard SG in order to prevent the non-combustible gas G, which has blown out of the blowoff nozzle n toward the cutting part 5A, from leaking outside of the fully closed splash guard SG. A vacuum device K actively suctions and collects the spent non-combustible gas G when the splash guard SG is fully closed.

Referring to FIGS. 2(a) and 2(b), a method of cutting by blowing non-combustible gas according to the second embodiment of the present invention will be described. There is a working machine 1 having a high-speed rotation spindle head 7 which supports a spindle 3 with a tool 5 attached to this spindle 3. There is a center hole 5B which serves as a gas supply hole and penetrates through the spindle 3 and the tool 5 in the axial direction of the spindle 3. The upper end of the center hole 5B goes beyond the rear section of the spindle 3, connecting to a gas supply (not shown) provided outside. The lower end of the center hole 5B reaches the outer surface of a cutting part 5A of the tool 5, so that an opening is formed on the outer surface of the cutting part 5A.

In this manner a concentrated supply of the non-combustible gas G is delivered to the machining point P, where machining is applied to a workpiece W (e.g., made of metal material or of non-metal material, such as ceramic or resin). Thus, it is possible to supply the non-combustible gas G inside of the workpiece W in the case of, for example, deep hole drilling, in which the non-combustible gas G cannot be supplied by using the blowoff nozzle n according to the first embodiment of the present invention. Accordingly, the most effective machining method can be applied to the workpiece W regardless of the machining conditions.

The non-combustible gas G, such as nitrogen gas N or carbon dioxide gas $CO_2$, is supplied by a non-combustible gas generation device 10 which generates the non-combustible gas G, or by a non-combustible gas tank (not shown), which serves as a gas supply. When the nitriding function of the present invention is desired, it is best to select nitrogen gas N.

The blow temperature of the non-combustible gas G is controlled within a range between room (e.g., normal) temperature and −150° C. so that cutting may be carried out at an optimal temperature. Temperature control is provided by a cooling device (not shown) serving as a temperature control device. The cooling device supplies the non-combustible gas G, the temperature of which is controlled to be optimal for the application to a workpiece W or a tool 5, to the center hole 5B. The supply of the non-combustible gas G to the center hole SB is also controlled so that optimal gas blow pressure for application to the workpiece W or the tool 5 may be obtained, within the range of 0.2–1.0 Mpa (2–10 kg/cm$^2$).

The spindle 3 of the working machine 1 is surrounded by a fully closed splash guard SG in order to prevent the non-combustible gas G, which blows out of the cutting part 5A, from leaking outside of the fully closed splash guard SG. A vacuum device K actively suctions and collects the spent non-combustible gas G' when the splash guard SG is fully closed.

The spent non-combustible gas G' may be recycled through a process by which the spent non-combustible gas G' is supplied from an air intake (not shown) of the non-combustible gas generation device 10, via a filter F which removes impurities. When cooling of the spent non-combustible gas G' is required, the gas G' may be supplied from the air intake of the non-combustible gas generation device 10 via a cooling device (not shown) and the filter F. Further, when a higher gas pressure is required, the gas G' may also be supplied via a pressure intensifier (not shown).

Referring to FIG. 3, the structure and function of the non-combustible gas generation device 10 is described in detail. According to the present embodiment, device 10 serves as a nitrogen gas generation device, which collects only nitrogen gas N from ordinary elements of the air (e.g., atmosphere).

The nitrogen gas generation device 10 utilizes a compression air supply E, which consists of compressed air having 80% nitrogen and 20% oxygen, in order to obtain a nitrogen gas supply. For this purpose there is an air compressor EC which compresses the air to a range of 0.4–0.8 Mpa 4–8 kg/cm$^2$) to produce the compressed air supply E. The compressed air supply E reaches any place or section inside of the factory via pipes provided for the compression air supply E. The compressed air supply E serves to actuate air-actuated devices or instruments inside of the factory.

The compressed air supply E flows through a water-removing filter F1 (comprising single stages—three stages) via an open/shut valve V1, thereby moisture-free dry air E1 is obtained. The dry air E1 is then heated to be about 50–60° C. by an electric heater, in order to obtain a good gas exchange efficiency.

The heated dry air E2 is then pumped into a plurality of filter elements R, connected in parallel, in order to collect only the nitrogen gas N from ingredients of the dry air E2. Each of the filter elements R is provided with a hollow fiber filter as the main component. When the dry air E2, made from the compressed air supply E, is pumped into the hollow fiber filter, the water, oxygen and carbon dioxide gas, having heavy molecular weight, cannot pass through the hollow fiber filter. Only the nitrogen gas N, with less molecular weight, can pass through the filter. Hence, the nitrogen gas N is collected separately and generated while the remaining water, oxygen and carbon dioxide gas are discharged into the atmosphere.

Each of the filter elements R is provided with a throttle valve V2 at the output. Output pipes P of the filter elements R are combined as one pipe P, to which an open/shut valve V3 is connected. The nitrogen gas N then feeds through a flow volume meter Q, a throttle valve V4 for the flow volume control, and an anti-reverse flow valve V5, and so forth until the nitrogen gas N is supplied to the outside. The number of the plurality of filter elements R, as well as the connecting arrangements, may be determined according to the amount or purity of the nitrogen gas N required, without limitation. The connecting arrangements of the filter elements R may be in parallel, in series, or in multiple combinations.

Second Embodiment

FIG. 4 illustrates, according to the second embodiment of the present invention, that the present invention may also use a nitrogen gas generation device 20. The nitrogen gas generation device 20 further comprises a pressure intensifying means HP in addition to the elements of the nitrogen gas generation device 10 according to the first embodiment as discussed above. This pressure intensifying means HP provides further intensification of the compressed air supply E, circulating through the factory after the air is initially compressed. For the purpose of the pressure intensifying means HP, an air-actuated device such as a small-sized air compressor or a pressure intensifier (e.g., cylinder) may be utilized.

Regarding the intensified pressure, the compressed air supply E has a pressure within a range of 4–8 kg/cm$^2$ and is intensified to a range of 0.6–1.2 Mpa (6–12 kg/cm$^2$). Therefore, as compared with the pressure intensification of ordinary air (0.6–1.2 Mpa or 6–12 kg/cm$^2$), for which a specially designed compressor is necessary, it is possible to intensify the pressure using a smaller size air compressor or pressure intensifying cylinder. This reduces equipment cost and "running cost".

The other elements of the nitrogen gas generation device 20, according to the second embodiment, are the same as those of the nitrogen gas generation device 10 used in a first embodiment and the same numerals are applied to the device 20. An explanation of these numerals will therefore not be provided.

The non-limiting examples discussed above show structures of the practical devices, to which a method of cutting metal and non-metal materials in a non-combustible gas atmosphere according to the present invention may be applied.

A cutting method according to the present invention which uses the above devices, as well as the results of such a method is now be described. According to the first embodiment of the present invention, the cutting of metal or non-metal materials by using non-combustible gas is carried out by using a non-combustible gas G such as a nitrogen gas N or a carbon dioxide gas $CO_2$. The non-combustible gas G is blown out of the blowoff nozzle n toward the cutting part 5A attached to the spindle 3 of the working machine 1. The non-combustible gas G supplies the pressure to the cutting part 5A and the workpiece W, so that an optimal pressure for the cutting part 5A and the workpiece W is obtained within a range of 0.2–1.0 Mpa (2–10 kg/cm$^2$). The blow temperature is also controlled to be optimal, between room (e.g., normal) temperature and –150° C.

According to the cutting method in the non-combustible gas atmosphere, the cutting part 5A and the workpiece W are cooled by the low-temperature, high-pressure non-combustible gas G, to maintain a lower cutting temperature. In this manner, thermal expansion of the cutting part 5A is avoided and high machining accuracy is obtained. In addition, the non-combustible gas G also removes the oxygen at the machining point which prevents oxidization of the cutting part 5A and of the workpiece W.

A benefit of removing the oxygen is that there is no risk of fire. After the cutting part 5A and the workpiece W cool, the non-combustible gas G is contained by the fully closed splash guard SG and actively collected by the vacuum suction device K. Accordingly, there is also no risk of air pollution.

The function of a cutting method according to a first embodiment of the present invention, in which nitrogen gas G is used in the non-combustible atmosphere, will now be described. When the tool 5 is driven at a high speed and the machining is applied to the workpiece W, the cutting part 5A rises in temperature (e.g., more than 500° C) from the cutting of the workpiece W. At this time, as illustrated in FIG. 1(b), the nitrogen gas N which is set to an optimal pressure for the cutting part 5A and the workpiece W, within the range of 0.2–1.0 Mpa (2–10 kg/cm$^2$) is blown from the blowoff nozzle n. Accordingly, the space around the cutting part 5A and the workpiece W is enveloped in nitrogen gas N, and thus a non-oxygen state is present in the space around the cutting part.

Figure 5:
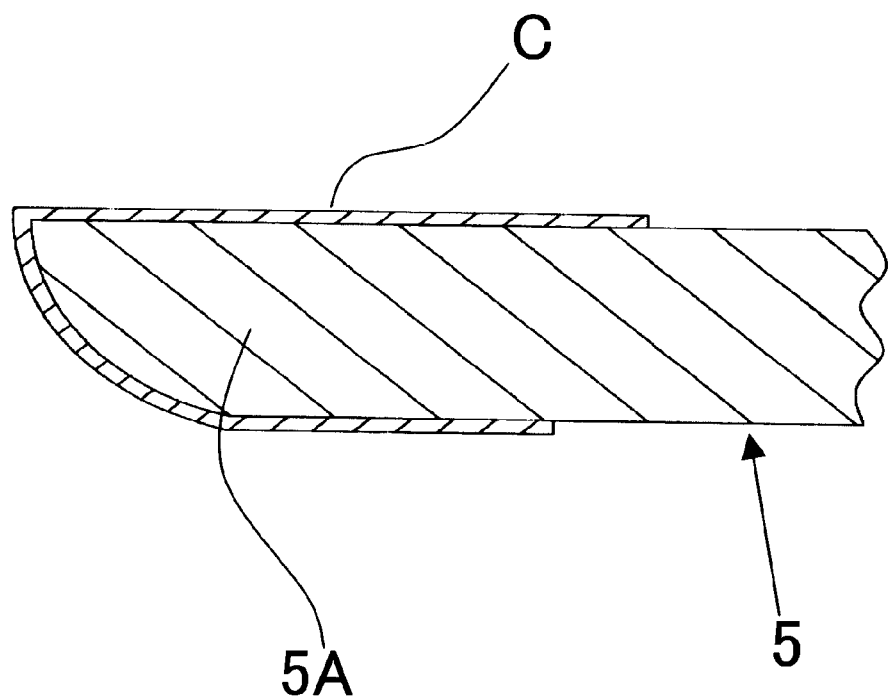
FIG. 5 is a sectional view of a cutting part that has been nitrided using the cutting method of the present invention.

In the non-oxygen state, when the cutting part 5A is enveloped by the nitrogen gas N, and when the high-temperature state (e.g., more than 500° C) of the cutting part 5A due to heat by machining is obtained, the cutting part 5A is ready to be nitrided. Thus there is adhesively formed a nitride C on the surface of the cutting part 5A during the application of the machining to the workpiece W, as illustrated in FIG. 5. The nitride C serves to protect the cutting part 5A as a coating layer with superior wear resistance.

If a coating has been formed on the cutting part 5A from the beginning of its use, the coating is strengthened in the atmosphere of nitrogen gas N, thus stronger wear resistance may be obtained. This is demonstrated by the fact that, when the state of the cutting part 5A is observed during machining, there is no sparking at the cutting part 5A even when the cutting part reaches the end of tool life, and there is no flaking (e.g., peel-off) of the coating, and no adhesion of the cutting chips to the tip.

In contrast, in the conventional art which does not have an atmosphere of nitrogen gas N, with regard to the tool 5 and the cutting part 5A, when the machining is applied to the workpiece W, the cutting part 5A is exposed in the high-temperature atmosphere, and thus wear of the cutting part 5A begins. According to the degree of wear present on the cutting part, the sharpness of the cutting part 5A becomes progressively worse, and as it worsens the heat of the cutting part increases, and consequently the wear on the tip is increased. This sequence of events accelerates the wearing out of the cutting part 5A.

In contrast, according to the present invention in which the cutting part 5A is in an atmosphere of nitrogen gas N, the higher the temperature of the cutting part 5A, the stronger the protection provided to the cutting part 5A since the nitriding of the tip is accelerated at a higher temperature. Thus, accelerated wear of the cutting part 5A is prevented and long-term sharp cutting results are obtained.

The nitriding of the cutting part 5A further serves to harden the surface of the cutting part 5A, as well as to lower the friction coefficient of the cutting part. Thus, less cutting resistance is provided by the workpiece W during machining, and a lubrication-like function can be expected even when lubricating oil is not used. Accordingly, longer tool life, improved accuracy of the machined surface, and cut chips of lower temperature can be achieved.

Referring to the comparative table of FIG. 6, the results of cutting according to the present invention are described. As shown in FIG. 6, the tool life of the conventional method of air blowing (e.g., "the air blow method") is not more than 10 hours. In contrast, the tool life using the present invention in which nitrogen gas N is used for blowing (e.g., "the nitrogen gas blow method") is extended up to 50–100 hours.

Further, the accuracy of the machined surface obtained using the air blow method, is 2 Rz, while the nitrogen gas blow method provides a result of 1.2–1.5 Rz.

Similarly, regarding the temperature of cut chips during machining, the air blow method is 1000° C. compared to that of the nitrogen gas blow method which is under 800° C.

Figure 7:
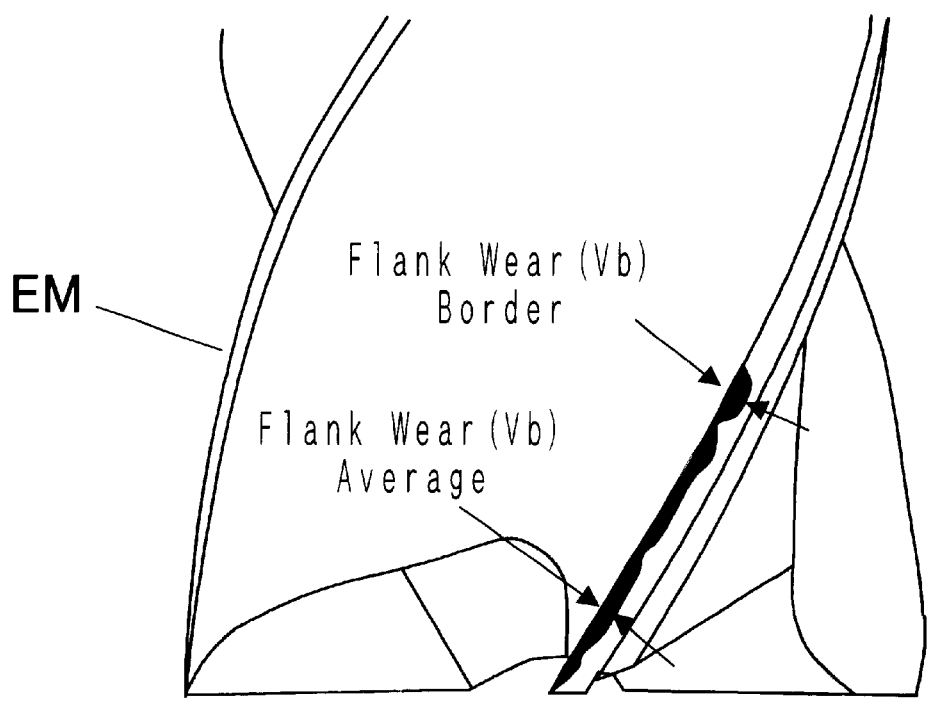
FIG. 7 is a detailed view of the cutting part of an end mill used for cutting according to the present invention.

Referring to FIG. 7, there is an expanded view of a cutting part of an end mill EM which was used for cutting according to the present invention, with an indication of peripheral flank wear. Reference symbol Vb represents the width (e.g., amount) of the boundary wear. The end mill EM serving as the tool 5 of FIG. 1 was attached to the spindle 3 of the working machine 1, and nitrogen gas N was blown out of the blowoff nozzle n toward the machining point.

Figure 8:
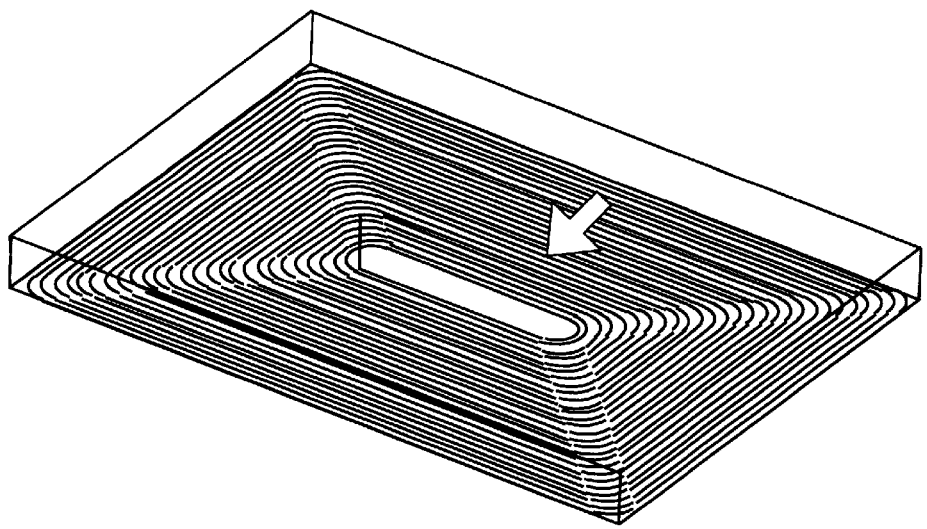
FIG. 8 is a view of a workpiece with an indication of cutting path, cut according to the present invention.

FIG. 8 illustrates an example of a workpiece to which the machining by the end mill EM was applied. In the case of machining shown in FIG. 8, an end mill (Ø 10) was provided to which a hard metal coating (TiN, TiCN or TiAlN) had been applied. The end mill was driven at the surface speed of 25–125 m, and a spiral outside cutting was applied to an iron-based material (S55C) workpiece at a Z axis cutting depth of 5 mm and at a X-Y axes cutting width of 2 mm. The blow pressure out of the blowoff nozzle n was controlled to be between 0.4–0.6 Mpa (4–6 kg/cm$^2$).

Figure 9:
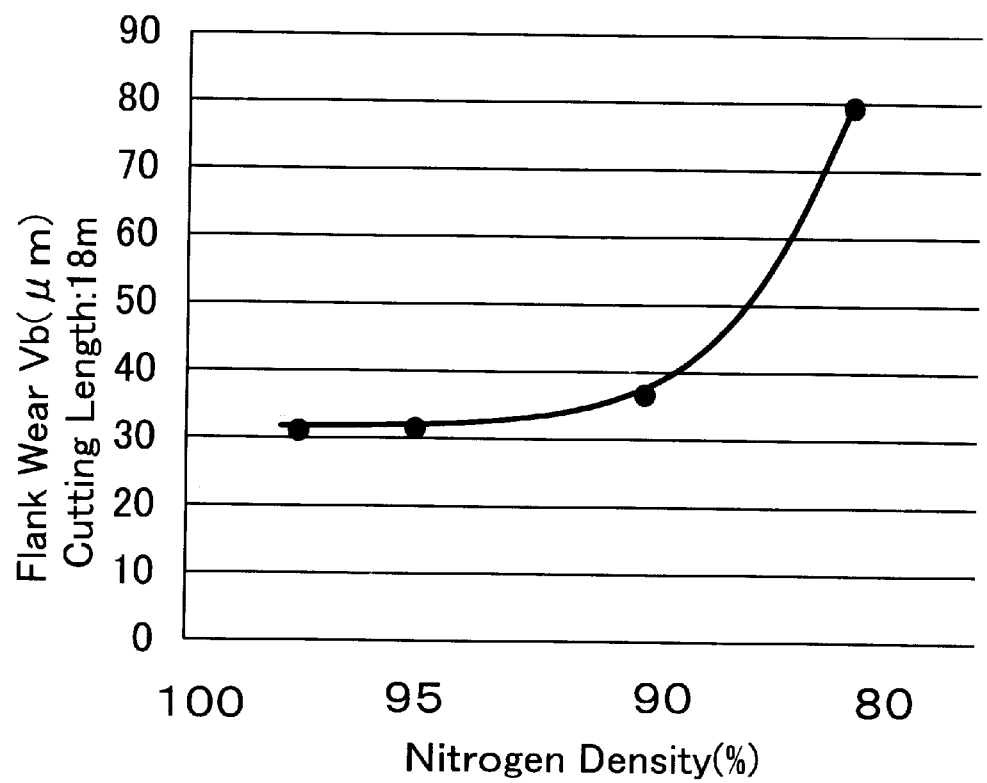
FIG. 9 is a graphic chart showing the relationship between the proportion of nitrogen gas and an amount of boundary wear to the tool according to the present invention.

FIG. 9 is a graphic chart showing the relation between "the proportion of nitrogen gas and boundary (e.g., flank) wear amount Vb" of the cutting part of the end mill EM when the cutting length was 18 mm. According to FIG. 9, when there was at least a proportion of 90% nitrogen gas (e.g., 10% oxygen), the boundary wear amount Vb decreased from 80 to 60 ($\mu$m). Thus, the enhancing effect of the nitrogen gas N is demonstrably proven.

Figure 10:
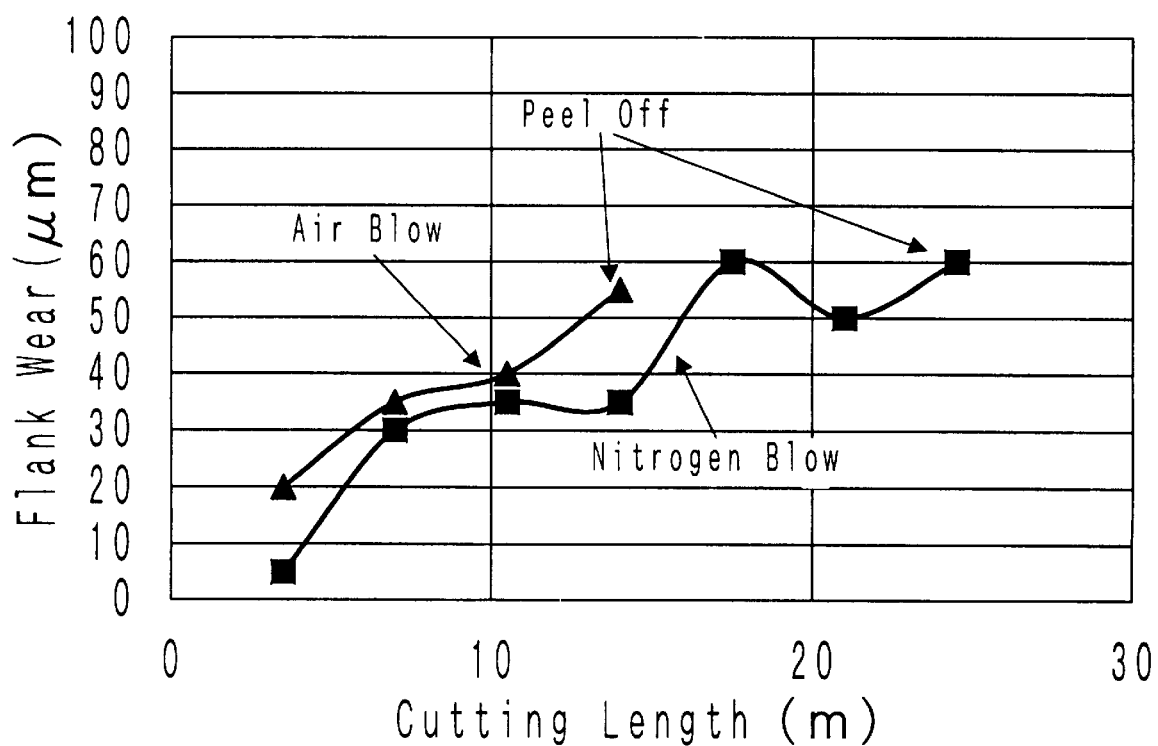
FIG. 10 is a graphic chart showing the relation between cutting length and an amount of coating wear according to the present invention.

FIG. 10 shows the results of a coating peel-off test in regards to the end mill EM, in which the difference between the "nitrogen gas blow" method and the "air blow" method is explained with reference to the relation between the cut length (m) of the workpiece and the wear amount ($\mu$m) of the tool.

In this peel-off test, the progress of wear in both the air blow method and the nitrogen gas blow method was very similar (e.g., 5–35 $\mu$m and 20–40 $\mu$m) before the cut length reached 10 m. After that, when the cut length reached 15 m, the air blow method caused peel-off at 60 $\mu$m of the wear amount. However, in the case of the nitrogen gas blow method, even when the cut length reached 20 m, the wear amount was held below 60 $\mu$m. It was not until the cut length reached 25 m that the nitrogen gas blow method allowed the peel-off at 60 $\mu$m of the wear amount.

Figure 11:
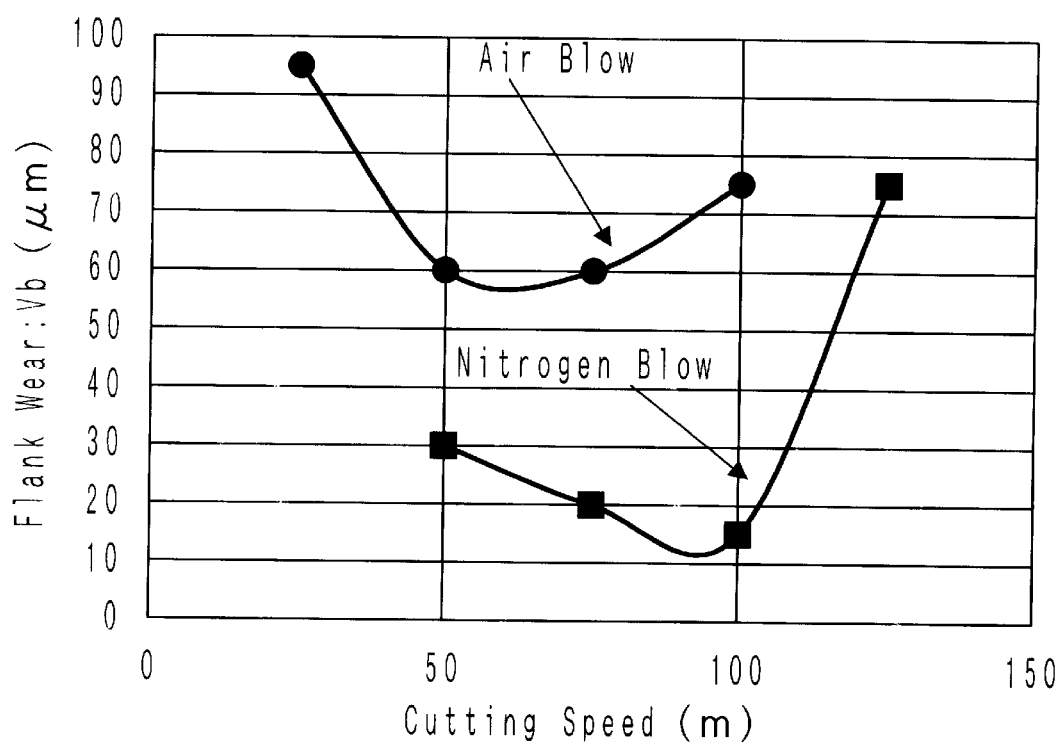
FIG. 11 is a graphic chart showing the relation between rotation speed of the end mill and an amount of wear according to the present invention.

FIG. 11 shows the results of a wear test, in which the relation between the surface speed (m) of the end mill EM and the wear amount Vb is explained. According to FIG. 11, the air blow method is represented by the characteristic curve of wear amount Vb as 60→57→75 ($\mu$m) at the surface speed of 50–100 m. In contrast, the nitrogen gas blow method is represented by the characteristic curve of wear amount Vb as 30→10→23 ($\mu$m) at the surface speed of 50–100 m, which is much smaller than the conventional method.

Figure 12:
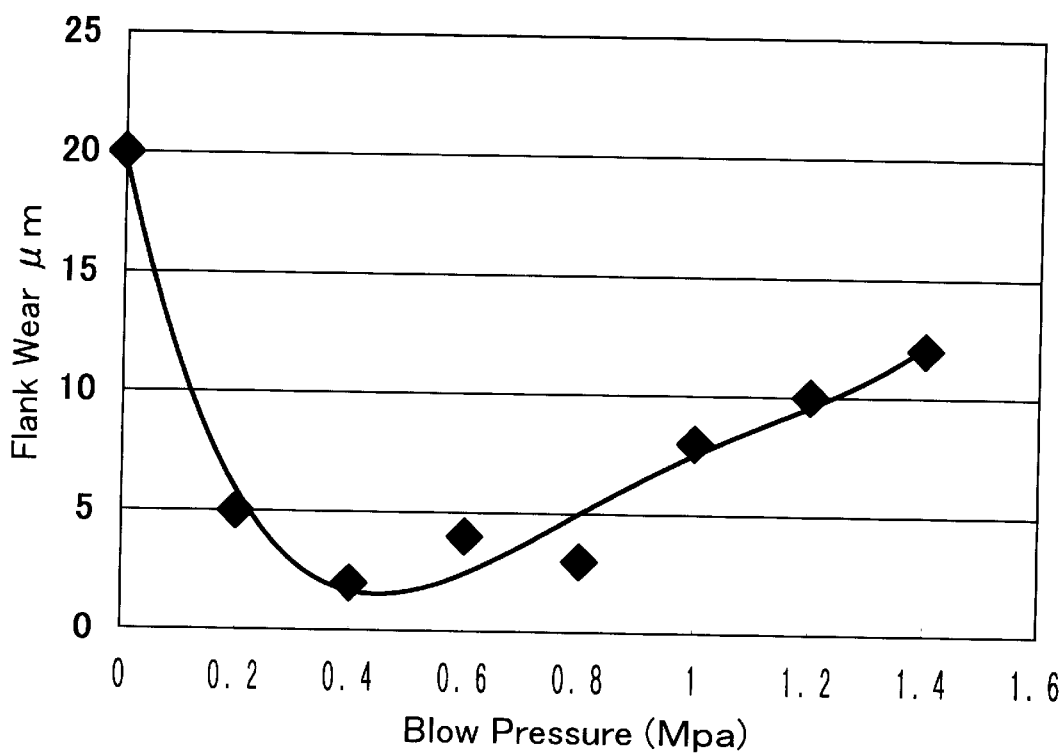
FIG. 12 is a graphic chart showing the relation between nitrogen gas blow pressure and an amount of peripheral flank wear of the end mill according to the present invention.

FIG. 12 shows the results of a test using an iron-based material (S55C), in which the relation between the nitrogen gas blow pressure and the peripheral flank wear amount of the end mill EM is explained. Applying 0 Mpa (0 kg/cm$^2$) of the nitrogen gas pressure to the end mill EM and the iron-based material, the wear amount was 20 Bm. When the gas pressure was 0.2 Mpa (2 kg/cm$^2$), the wear amount decreased to 5 $\mu$m. Using a gas pressure of 0.4 Mpa (4 kg/cm$^2$), the smallest wear amount of 2.5 $\mu$m, was recorded.

The characteristic curve gently rises as illustrated in FIG. 12, having 4 $\mu$m at 0.6 Mpa (6 kg/cm$^2$), 3 $\mu$m at 0.8 Mpa (8 kg/cm$^2$), and 8 $\mu$m at 1.0 Mpa (10 kg/cm$^2$). As seen from the characteristic curve, the ideal nitrogen gas pressure was found to be within a range of 0.2–1.0 Mpa (2–10 kg/cm$^2$). Regarding the other metal materials, the characteristic curves were essentially the same as that of FIG. 12.

FIG. 13 shows the results of a test in which the relation between the nitrogen gas blow temperature and the peripheral flank wear amount of the end mill EM is explained. In the test shown in FIG. 13, the nitrogen gas blow temperature was set between −30° C. and +30° C. and the respective peripheral flank wear amounts Vbs of the end mill EM were measured according to the type of metal material (e.g., iron steels, S55C and SKD 61, stainless steel, SUS 304, and aluminum material, A5052).

As illustrated in FIG. 13, when the temperature is between −30° C. and +30° C. each metal material represents wear amount Vb. However, in regards to the iron steel materials (S55C and SKD 61), the wear amounts Vb suddenly rose at +30° C. to 70 $\mu$m and 100 $\mu$m, respectively. The cutting of aluminum material according to the present invention, and the results produced, are described with reference to FIG. 14(a) and 14(b). The nitrogen gas N is blown out of the blowoff nozzle n toward the cutting part 5A of the tool 5 attached to the spindle 3 of the working machine 1. The nitrogen gas N supplies the pressure to the cutting part 5A and a workpiece W', so that the ideal pressure for the cutting part 5A and the workpiece W' is obtained, within a range of 0.2–1.0 Mpa (2–10 kg/cm$^2$). The blow temperature is also set to an optimal temperature, between room (e.g., normal) temperature and −150° C.

When the cutting part 5A is driven at a high speed and the machining is applied to the workpiece W', the cutting part 5A rises in temperature (e.g., more than 500° C.) due to the cutting of the workpiece W'. At this time, as illustrated in FIG. 1(b), the nitrogen gas N which is set to an optimal pressure for the cutting part 5A and the aluminum workpiece W', within the range of 0.2–1.0 Mpa (2–10 kg/cm$^2$) is blown from the blowoff nozzle n. As a result, the space W' is enveloped by the nitrogen gas N, and a non-oxygen state around the space W' is created.

Figure 14A:
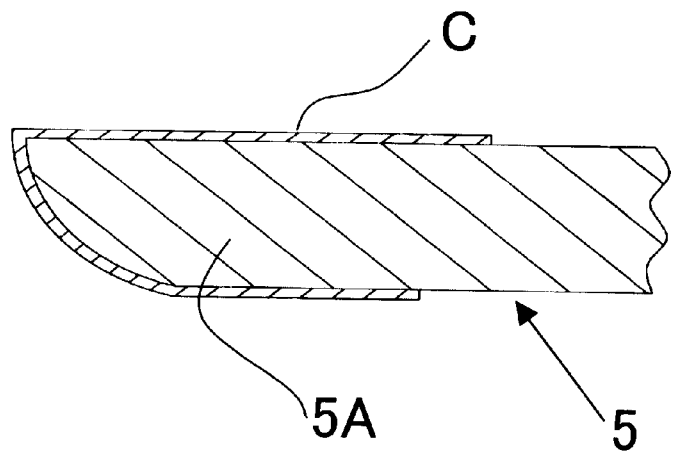
FIGS. 14(a) and 14(b) are detailed views of a cutting part by which an aluminum material was cut according to the present invention, and of a cutting part by which an aluminum material was cut according to the conventional art, respectively.

In the non-oxygen state, as the cutting part 5A is enveloped by the nitrogen gas N, and a high-temperature state (more than 500° C.) of the cutting part 5A due to heat from machining is obtained, the cutting part 5A is ready to be nitrided. Thus there is formed a nitride C on the surface of the cutting part 5A, as illustrated in FIG. 14(a). The nitride C protects the cutting part 5A as a coating layer with superior wear resistance.

Figure 14B:
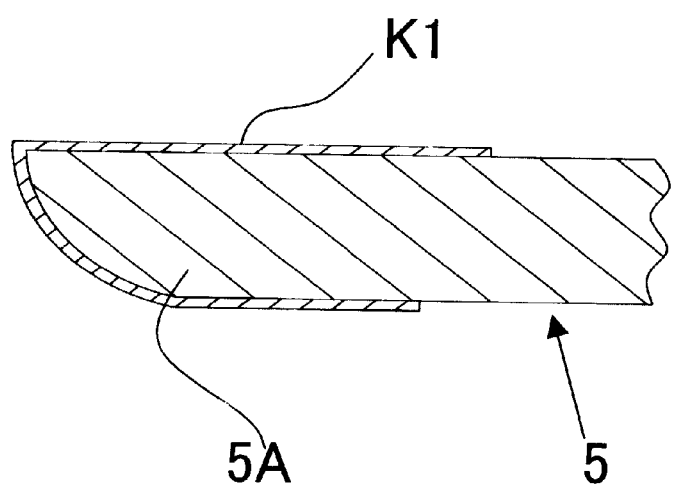

When the machining is applied to the aluminum workpiece W' in the atmosphere of the air blow method, a built-up edge K1 is formed on the metal surface of the cutting part 5A. This characteristic of the aluminum workpiece W is illustrated in FIG. 14(b). As a result of the built-up edge, the sharpness of the cutting part 5A diminishes, which results in shorter tool life, an inferior machined surface, and a higher cut power temperature. The results of a comparative test are shown in FIG. 6, in which cooling by the air blow method and cooling by the nitrogen gas blow method were applied to the same type of cutting part 5A. The results of the machining to the aluminum workpiece W' were essentially the same results as those for the iron steel material.

In the conventional art, when the machining is applied to the aluminum material, the cutting part 5A is generally exposed in the high-temperature atmosphere, thus wear of the cutting part 5A is initiated. According to the degree of wear, the sharpness of the cutting part 5A deteriorates, the heating of the tip increases, and eventually wear is accelerated. This spiral of events causes the sudden wear-out of the cutting part 5A.

In contrast, according to the present invention in which the cutting part 5A is in an atmosphere of nitrogen gas N, the higher the cutting part 5A becomes in temperature, the stronger the protection of the cutting part 5A becomes since the nitriding is accelerated at high-temperature. Thus, a sudden wearing-out of the cutting part 5A is prevented and long-term sharp cutting is obtained.

In particular, when using the nitrogen gas blow method of cutting, the cutting part 5A is cooled by a low-temperature, high-pressure nitrogen gas N, thereby maintaining a lower cutting temperature. In this way, thermal expansion of the cutting part 5A is prevented, and high machining accuracy is obtained. Additionally, because the nitrogen gas N also removes the oxygen at the machining point, oxidization of the cutting part 5A is prevented. A further benefit is that in a non-oxygen state there is no risk of fire.

The present embodiment is not limited to cutting aluminum material. For example, the present invention may also be utilized as a method of nitriding an aluminum material. An embodiment of the present invention in which the aluminum material is nitrided will now be described with reference to FIGS. 15, 16(a) and 16(b). The blowoff nozzle n is aimed at the aluminum workpiece W' to which the machining is applied by the cutting part 5A of the tool 5 attached to the spindle 3 of the working machine 1. The blowoff nozzle n is mounted on the spindle head 7.

The temperature of the nitrogen gas N blown out of the blowoff nozzle n is set to an optimal temperature, between room (e.g., normal) temperature and −150° C. The temperature control is provided by the cooling device, so that the nitrogen gas N, at ideal temperature for the aluminum workpiece W', is supplied to the blowoff nozzle n. The blow pressure of the nitrogen gas N is set to an optimal pressure for the aluminum workpiece W', within a range of 0.2–1.0 Mpa (2–10 kg/cm$^2$).

Figure 15:
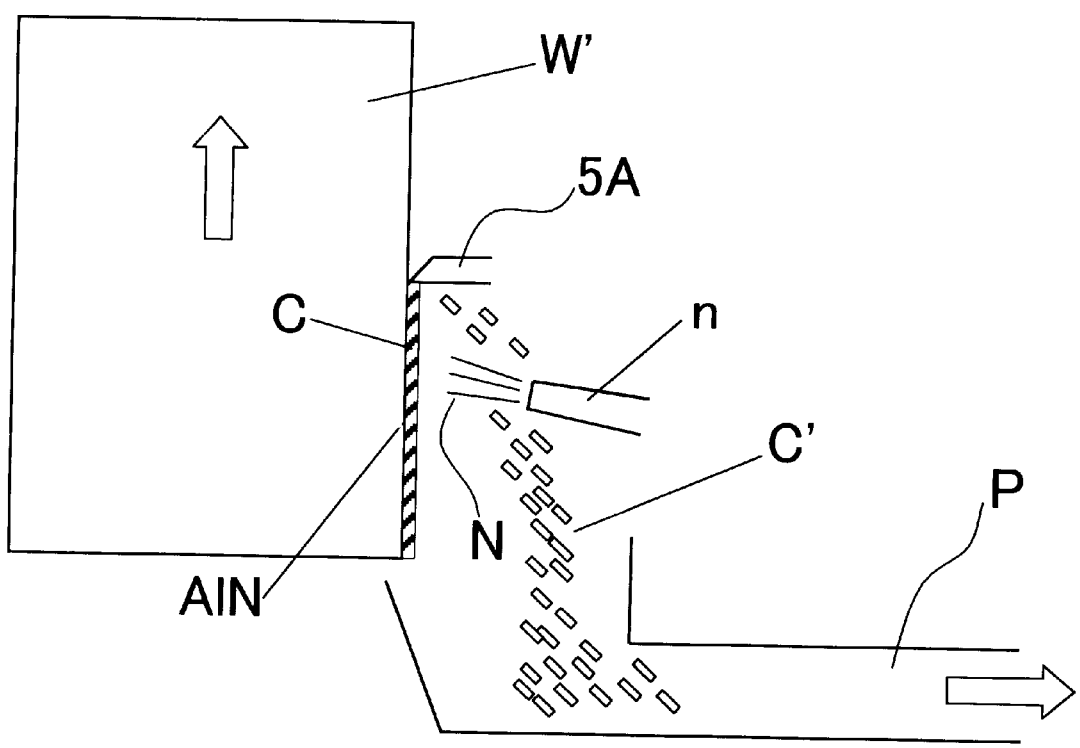
FIG. 15 is a view illustrating a method of nitriding a surface of aluminum material according to the present invention.

When the tool 5 is driven at a high speed and the machining is applied to a workpiece W' made of aluminum material, the cutting part 5A rises in temperature (e.g., more than 500° C.) due to the cutting of the aluminum workpiece W'. As illustrated in FIG. 15, the nitrogen gas N which is set to an optimal pressure for the aluminum workpiece W', within a range of 0.2–1.0 Mpa (2–10 kg/cm$^2$), is blown from the blowoff nozzle n. Accordingly, the space around the aluminum workpiece W' becomes enveloped in the nitrogen gas N, and there is a non-oxygen state around this space.

In the non-oxygen state, as the aluminum workpiece W' is enveloped by the nitrogen gas N and as the high-temperature state (e.g., more than 500° C.) of the workpiece W', due to machining, is reached, the aluminum workpiece W' is ready to be nitrided. A nitride C (A1N) is formed on the surface of the aluminum workpiece W', as illustrated in FIG. 15.

Figure 16A:
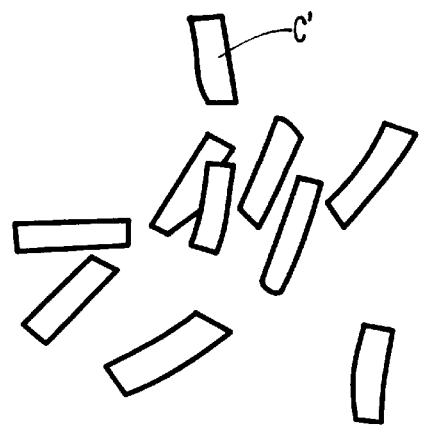
FIGS. 16(a) and 16(b) are views of cut chips of aluminum materials which were cut according to the present invention as shown in FIG. 15 and chips cut according to the conventional art, respectively.
Figure 16B:
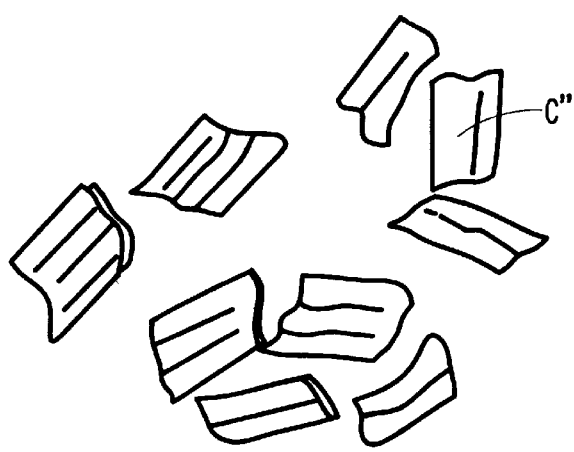

The nitride C is instantly cut by the cutting part 5A, and falls as crumble cut chips C'. The cut chips C' are then collected, without leaving a single chip, by a cut chip collection pipe P' that is vacuum-actuated. Each of the crumble cut chips C' is represented as a separate rice-shape, as shown in FIG. 16(a). In contrast, when cut chips C" result from the air blow or any other cooling method, each of the cut chips C" is represented as a parallel chain-shape, as illustrated in FIG. 16(b).

Figure 17A:
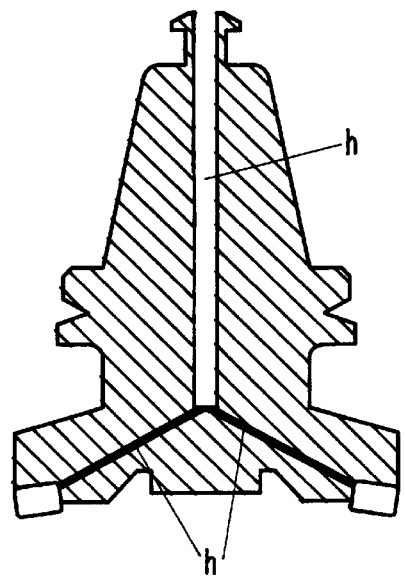
FIGS. 17(a), 17(b) and 17(c) are sectional views showing practical examples of tools with center holes according to the present invention.

In addition, with regard to the second embodiment of the present invention as illustrated in FIG. 2(b), there is a center hole 5B that penetrates through the various cutting tools so that the non-combustible gas G is supplied thereto according to the present invention. FIGS. 17(a), (b) and (c) are sectional views of a face mill, an end mill, and a ball end mill, respectively.

Figure 17B:
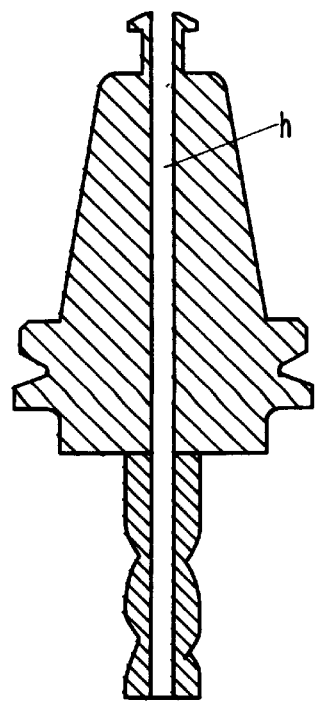
Figure 17C:
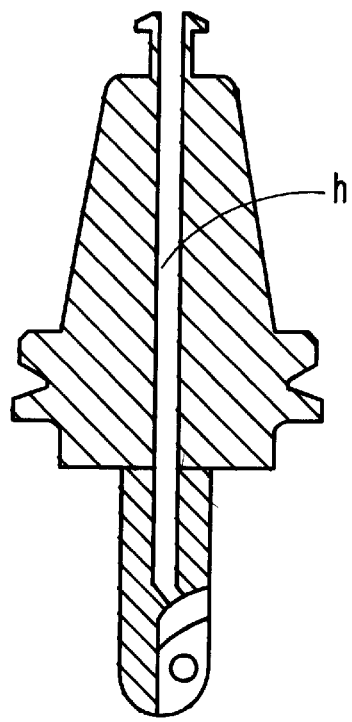

As shown in FIGS. 17(a–c), there are provided center holes h, instead of reference numeral 5A as in FIG. 2(b), penetrating through the respective tools. The non-combustible gas G such as nitrogen N is supplied to this center hole h. In this structure, certain effects can be observed.

Firstly, it is possible to blow the nitrogen gas N or other gas directly to the cutting part 5A from the center hole h having an opening at the cutting part 5A. The maximum function and effect can be obtained even with a minimal flow of nitrogen gas N. As a result, the gas generation device may be of a minimum size and running costs may be reduced.

Secondly, the nitrogen gas N is attracted and adheres to the layer of coating on the cutting part 5A, and in this manner a new layer of nitriding is formed. Therefore, stronger coating protection is afforded.

Thirdly, oxidation of the cutting part 5A is prevented, and the tip is able to be sufficiently cooled. Hence, the heat of a cutting part 5A is kept under 800–900° C. thereby allowing longer tool life of the cutting part 5A.

Since the method of cutting according to the present invention increases oxidation resistance and cooling, it can also, after creating the non-oxygen state around the metal material which might have become overheated at the machining point, prevent the metal material from igniting. Therefore, when the object is to create a non-oxygen state at the machining point, it is possible to use a carbon dioxide gas, instead of the nitrogen gas N, as the non-combustible gas G.

It is clear that the application of the method of cutting metal and non-metal materials in a non-combustible gas atmosphere according to the present invention is not limited to the working machine 1 as discussed above. For example, the present invention can be applied to a lathe, a gear cutting machine, a grinding machine, and other like-kind machinery.

Figure 18:
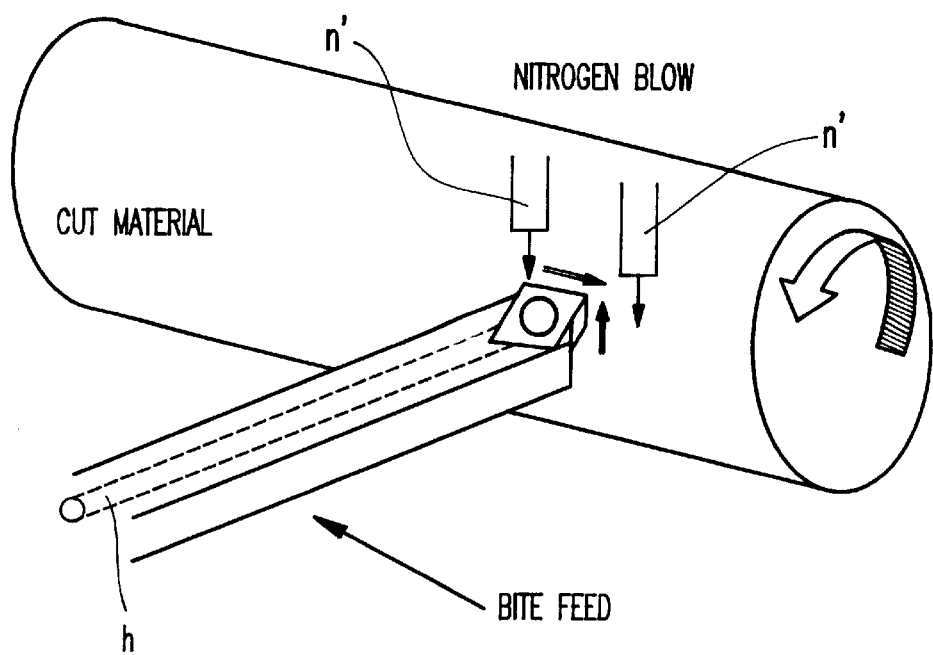
FIG. 18 is a schematic view of a lathe to which the present invention is applied.

The present invention can also be applied to a drilling machine capable of drilling small holes, or to an automated production line. FIG. 18, for example, shows the present invention applied to a lathe. The nitrogen gas may be blown out of nozzles n', as illustrated, or may be supplied to a cutting part from a center hole h provided on a bite feed.

In addition, the metal material to be cut is not limited to those types discussed in the embodiments above. The improvements and advantages obtained with nitrogen gas or carbon dioxide gas can also be replicated exactly on other types of metal material. Further, when the present invention is applied to non-metal materials, such as resin or ceramic, it is of course possible to obtain these same desired effects as well.

While the invention has been described in terms of several preferred embodiments, those skilled in the art will recognize that the invention can be practiced with modification within the spirit and scope of the appended claims.

What is claimed is:

1. A method of selectively cutting at least one of metal materials and non-metal materials in a non-combustible gas atmosphere, comprising:

forming a non-combustible gas atmosphere;

providing said non-combustible gas atmosphere at at least one of a cutting part of a machine tool and an area adjacent to said cutting part; and selectively machining at least one of said metal materials and said non-metal materials using said cutting part, wherein said non-combustible gas includes one of nitrogen gas and carbon dioxide gas, and said non-combustible gas occupies a proportion of at least 90% of said non-combustible gas atmosphere, and wherein said cutting part includes a hard metal coating layer formed along a cutting edge thereof.

2. The method as claimed in claim 1, further comprising:

supplying said non-combustible gas at a pressure selected substantially within a range of about 0.2 Mpa (2 kg/cm$^2$) and about 1.0 Mpa (10 kg/cm$^2$).

3. The method as claimed in claim 1, further comprising:

supplying said non-combustible gas to said cutting part by a blowoff nozzle.

4. The method as claimed in claim 1, wherein said metal material selected to be cut is an iron-based material.

5. The method as claimed in claim 1, wherein said metal material selected to be cut is an aluminum material.

6. The method, as recited in claim 1, further comprising:

suctioning and collecting spent non-combustible gas from said non-combustible gas atmosphere.

7. A method of selectively cutting at least one of metal materials and non-metal materials in a non-combustible gas atmosphere, comprising:

forming a non-oxide gas atmosphere of a nitrogen gas;

providing said non-oxide gas atmosphere at at least one of a cutting part of a machine tool and an area adjacent to said cutting part; and selectively applying machining to at least one of said metal materials and said non-metal materials using said cutting part, wherein said nitrogen gas occupies a proportion of at least 90% of said non-oxide gas atmosphere, and a machining temperature at said cutting part is not less than 500° C., and wherein said cutting part includes a hard metal coating layer formed along a cutting edge thereof.

8. The method as claimed in claim 7, wherein said coating further comprises a multi-ply coating.

9. The method as claimed in claim 7, further comprising:

supplying said non-combustible gas at a pressure selected substantially within a range of about 0.2 Mpa (2 kg/cm$^2$) and about 1.0 Mpa (10 kg/cm$^2$).

10. The method as claimed in claim 7, further comprising:

supplying said non-combustible gas to said cutting part by a blowoff nozzle.

11. The method as claimed in claim 2, wherein said metal material selected to be cut is an iron-based material.

12. The method as claimed in claim 7, wherein said metal material selected to be cut is an aluminum material.

13. The method, as recited in claim 7, further comprising:

suctioning and collecting spent non-combustible gas from said non-combustible gas atmosphere.

14. A method of cutting at least one of metal materials and non-metal materials in a non-combustible gas atmosphere, comprising:

forming a non-combustible gas atmosphere;

providing said non-combustible gas atmosphere at at least one of a cutting part of a machine tool and an area adjacent to said cutting part;

machining at least one of said metal materials and said non-metal materials using said cutting part; and supplying said non-combustible gas to said cutting part by a supply hole penetrating through said tool, wherein said non-combustible gas includes one of nitrogen gas and carbon dioxide gas, and wherein said non-combustible gas occupies a proportion of at least 90% of said non-combustible gas atmosphere.

15. A method of cutting at least one of metal materials and non-metal materials in a non-combustible gas atmosphere, comprising:

forming a non-oxide gas atmosphere of a nitrogen gas;

providing said non-oxide gas atmosphere at at least one of a cutting part of a machine tool and an area adjacent to said cutting part;

applying machining to at least one of said metal materials and said non-metal materials using said cutting part; and supplying said non-combustible gas to said cutting part by a supply hole penetrating through said tool, wherein said nitrogen gas occupies a proportion of at least 90% of said non-oxide gas atmosphere, and wherein a machining temperature at said cutting part is not less than 500° C.

16. A method of cutting materials using a machine tool, said machine tool comprising:

a gas jet nozzle for directing a non-combustible gas atmosphere to a cutting part, said cutting part being formed with a hard metal coating layer along a cutting edge thereof;

wherein said non-combustible gas atmosphere comprises a concentration of nitrogen gas in excess of 90%, wherein a machining temperature at said cutting part is higher than 500° C. and a jet nozzle pressure to said cutting part is at a pressure selected substantially within a range of about 0.2 Mpa (2 kg/cm$^2$) and about 1.0 Mpa (10 kg/cm$^2$), and wherein said cutting part selectively cuts materials including metal materials and non-metal materials.

17. The method of cutting materials using a machine tool, as claimed in claim 16, wherein said materials selected are metal materials, and wherein said metal materials are ferrous metals.

18. The method of cutting materials using a machine tool, as claimed in claim 16, wherein said materials selected are metal materials, and wherein said metal materials are aluminum.

19. A method of cutting materials using a machine tool, said machine tool comprising:

a gas supply port penetrating through said tool for directing a non-combustible gas atmosphere to a cutting part, said cutting part being formed with a hard metal coating layer along a cutting edge thereof;

wherein said non-combustible gas atmosphere comprises a concentration of nitrogen gas in excess of 90%, wherein a machining temperature at said cutting part is higher than 500° C. and a gas supply port pressure to said cutting part is at a pressure selected substantially within a range of about 0.2 Mpa (2 kg/cm$^2$) and about 1.0 Mpa (10 kg/cm$^2$), and wherein said cutting part selectively cuts materials including metal materials and non-metal materials.

20. The method of cutting materials using a machine tool, as claimed in claim 19, wherein said materials selected are metal materials, and wherein said metal materials are ferrous metals.

21. The method of cutting materials using a machine tool, as claimed in claim 19, wherein said materials selected are metal materials, and wherein said metal materials are aluminum.

22. A method of processing a material in a non-combustible gas atmosphere, comprising:

forming said non-combustible gas atmosphere;

providing said non-combustible gas atmosphere at one of directly at and adjacent a cutting part of a machining tool; and selectively applying machining to said material using said cutting part within said non-combustible gas atmospheres wherein said cutting part includes a hard metal coating layer formed along a cutting edge thereof.

23. The method of claim 22, wherein said non-combustible gas atmosphere occupies a proportion of at least 90% of a nitrogen gas.

24. The method of claim 22, wherein said non-combustible gas atmosphere occupies a proportion of at least 90% carbon dioxide gas.

25. The method of claim 22, wherein said non-combustible gas atmosphere occupies a space around said cutting part.

26. The method of claim 22, wherein said material comprises one of a group consisting of iron-based material, aluminum, ceramic, and resin.

27. The method of claim 22, further comprising:

nitriding said cutting part to adhesively form a nitride on a surface of said cutting part.

28. The method of claim 27, wherein said nitriding is performed when said cutting part has a temperature exceeding 500° C.

29. The method of processing, as claimed in claim 22, further comprising:

suctioning and collecting spent non-combustible gas from said non-combustible gas atmosphere.

\* \* \* \* \*